United States Patent
Meylan et al.

(10) Patent No.: US 11,564,242 B2
(45) Date of Patent: Jan. 24, 2023

(54) LOW-LATENCY SCHEDULING REQUEST CONFIGURATION

(71) Applicant: QUALCOMM Incorporated, San Diego, CA (US)

(72) Inventors: Arnaud Meylan, San Diego, CA (US); Arvind Vardarajan Santhanam, San Diego, CA (US); Sunil Kandukuri, San Diego, CA (US); Satashu Goel, San Diego, CA (US); Ashok Mantravadi, San Diego, CA (US); Sitaramanjaneyulu Kanamarlapudi, San Diego, CA (US); Vaibhav Kumar, Encinitas, CA (US); Mahbod Ghelichi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 16/896,871

(22) Filed: Jun. 9, 2020

(65) Prior Publication Data

US 2021/0385825 A1 Dec. 9, 2021

(51) Int. Cl.
*H04W 72/12* (2009.01)
*H04W 76/28* (2018.01)
(Continued)

(52) U.S. Cl.
CPC ... *H04W 72/1257* (2013.01); *H04W 28/0263* (2013.01); *H04W 28/0278* (2013.01);
(Continued)

(58) Field of Classification Search
CPC ............ H04W 72/1257; H04W 76/28; H04W 28/0263; H04W 80/02; H04W 72/14; H04W 72/1273; H04W 28/0278
See application file for complete search history.

(56) References Cited

U.S. PATENT DOCUMENTS

2018/0152961 A1* 5/2018 Yamazaki ............. H04L 1/1812
2018/0316480 A1* 11/2018 Ohta ..................... H04L 5/0053
(Continued)

FOREIGN PATENT DOCUMENTS

| EP | 3404896 A1 | 11/2018 |
|----|-----------|---------|
| EP | 3404897 A1 | 11/2018 |

(Continued)

OTHER PUBLICATIONS

The Chromium Projects, "QUIC, a multiplexed stream transport over UDP", https://www.chromium.org/quic, Nov. 14, 2014, 2 pages.
(Continued)

*Primary Examiner* — Ajay Cattungal
(74) *Attorney, Agent, or Firm* — Harrity & Harrity, LLP

(57) ABSTRACT

Various aspects of the present disclosure generally relate to wireless communication. In some aspects, a user equipment may receive downlink data that is associated with triggering a feedback message; transmit, before receiving the feedback message for the downlink data at a component of the user equipment, a scheduling request to request an allocation of a set of resources for transmitting the feedback message; and transmit the feedback message in connection with the set of resources. Numerous other aspects are provided.

30 Claims, 11 Drawing Sheets

(51) Int. Cl.
  *H04W 28/02* (2009.01)
  *H04W 72/14* (2009.01)
  *H04W 80/02* (2009.01)

(52) U.S. Cl.
  CPC ....... *H04W 72/1273* (2013.01); *H04W 72/14* (2013.01); *H04W 76/28* (2018.02); *H04W 80/02* (2013.01)

(56) References Cited

U.S. PATENT DOCUMENTS

| | | | |
|---|---|---|---|
| 2018/0324790 A1* | 11/2018 | Ohta | H04L 5/0055 |
| 2019/0075014 A1* | 3/2019 | Zhou | H04L 5/0048 |
| 2019/0097874 A1* | 3/2019 | Zhou | H04L 5/0023 |
| 2019/0141546 A1* | 5/2019 | Zhou | H04W 72/1294 |
| 2019/0207662 A1* | 7/2019 | Zhou | H04L 5/0048 |
| 2020/0092685 A1* | 3/2020 | Feh | H04W 36/18 |
| 2020/0280358 A1* | 9/2020 | Li | H04L 1/1858 |
| 2021/0037521 A1* | 2/2021 | Ohta | H04W 28/0273 |
| 2021/0120551 A1* | 4/2021 | Meylan | H04W 72/0446 |
| 2021/0176012 A1* | 6/2021 | Xu | H04W 52/0229 |

FOREIGN PATENT DOCUMENTS

| | | |
|---|---|---|
| EP | 3422658 A1 | 1/2019 |
| WO | 2021080993 | 4/2021 |

OTHER PUBLICATIONS

3GPP, "NR; Medium Access Control (MAC) protocol specification", 78 pages, Dec. 2019.
International Search Report and Written Opinion—PCT/US2021/070449—ISA/EPO—Aug. 23, 2021.

* cited by examiner

LOW-LATENCY SCHEDULING REQUEST CONFIGURATION

FIELD OF THE DISCLOSURE

Aspects of the present disclosure generally relate to wireless communication and to techniques and apparatuses for low-latency scheduling request configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include receiving downlink data that is associated with triggering a feedback message; transmitting, before receiving the feedback message for the downlink data at a component of the UE, a scheduling request to request an allocation of a set of resources for transmitting the feedback message; and transmitting the feedback message in connection with the set of resources.

In some aspects, a method of wireless communication, performed by a user equipment, may include receiving downlink data; determining a schedule of a set of uplink channel resources associated with a medium access control layer; altering a behavior of data layer traffic based at least in part on a characteristic of the uplink channel resources; and transmitting a feedback message in connection with one or more of the uplink channel resources and based at least in part on altering the behavior of the data layer traffic.

In some aspects, a user equipment for wireless communication may include memory and one or more processors coupled to the memory. For example, the one or more processors may be operatively, electronically, communicatively, or otherwise coupled to the memory. The memory may include instructions executable by the one or more processors to cause the user equipment to receive downlink data that is associated with triggering a feedback message; transmit, before receiving the feedback message for the downlink data at a component of the UE, a scheduling request to request an allocation of a set of resources for transmitting the feedback message; and transmit the feedback message in connection with the set of resources.

In some aspects, a user equipment for wireless communication may include memory and one or more processors coupled to the memory. For example, the one or more processors may be operatively, electronically, communicatively, or otherwise coupled to the memory. The memory may include instructions executable by the one or more processors to cause the user equipment to receive downlink data; determine a schedule of a set of uplink channel resources associated with a medium access control layer; alter a behavior of data layer traffic based at least in part on a characteristic of the uplink channel resources; and transmit a feedback message in connection with one or more of the uplink channel resources and based at least in part on altering the behavior of the data layer traffic.

In some aspects, a non-transitory computer-readable medium may store one or more instructions for wireless communication. The one or more instructions, when executed by one or more processors of a user equipment, may cause the user equipment to receive downlink data that is associated with triggering a feedback message; transmit, before receiving the feedback message for the downlink data at a component of the UE, a scheduling request to request an allocation of a set of resources for transmitting the feedback message; and transmit the feedback message in connection with the set of resources.

In some aspects, a non-transitory computer-readable medium may store one or more instructions for wireless communication. The one or more instructions, when executed by one or more processors of a user equipment, may cause the user equipment to receive downlink data; determine a schedule of a set of uplink channel resources associated with a medium access control layer; alter a behavior of data layer traffic based at least in part on a characteristic of the uplink channel resources; and transmit a feedback message in connection with one or more of the uplink channel resources and based at least in part on altering the behavior of the data layer traffic.

In some aspects, an apparatus for wireless communication may include means for receiving downlink data that is associated with triggering a feedback message; means for transmitting, before receiving the feedback message for the downlink data at a component of the UE, a scheduling request to request an allocation of a set of resources for transmitting the feedback message; and means for transmitting the feedback message in connection with the set of resources.

In some aspects, an apparatus for wireless communication may include means for receiving downlink data; means for determining a schedule of a set of uplink channel resources associated with a medium access control layer; means for altering a behavior of data layer traffic based at least in part on a characteristic of the uplink channel resources; and means for transmitting a feedback message in connection with one or more of the uplink channel resources and based at least in part on altering the behavior of the data layer traffic.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
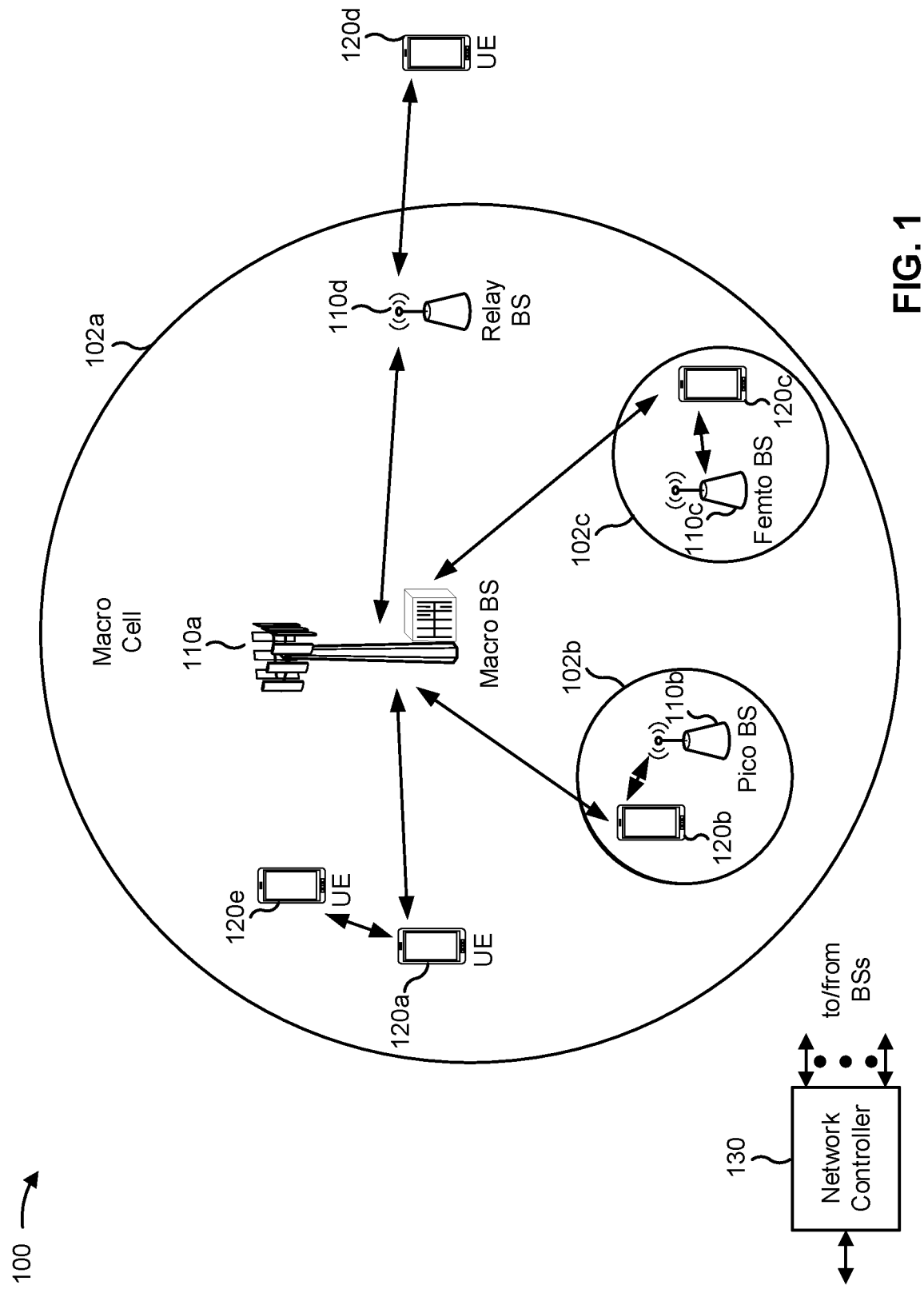
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
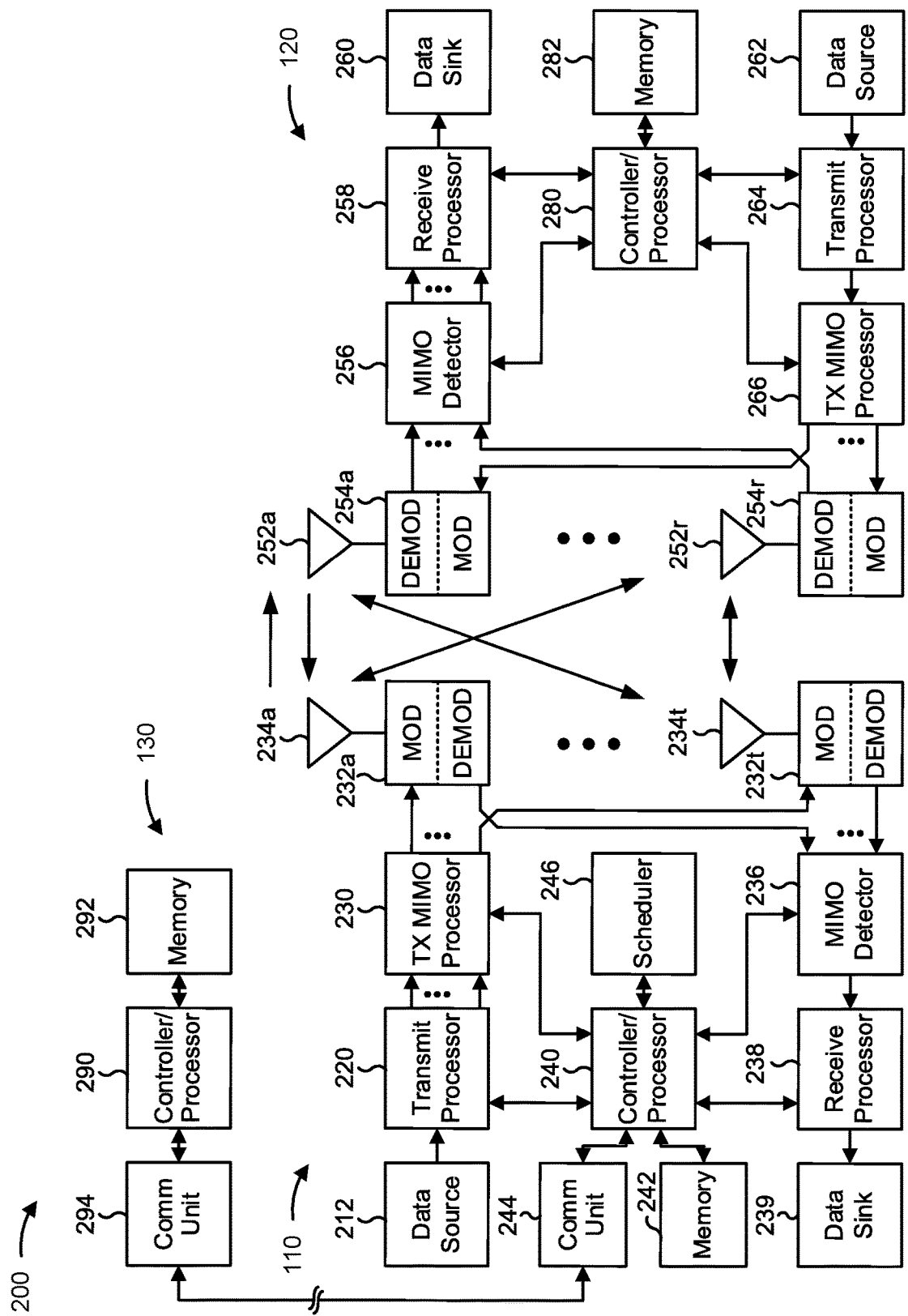
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with low-latency scheduling request configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving downlink data that is associated with triggering a feedback message, means for transmitting, before receiving the feedback message for the downlink data at a component of the UE, a scheduling request to request an allocation of a set of resources for transmitting the feedback message, means for transmitting the feedback message in connection with the set of resources, and/or the like. In some aspects, UE 120 may include means for receiving downlink data, means for determining a schedule of a set of uplink channel resources associated with a medium access control layer, means for altering a behavior of data layer traffic based at least in part on a characteristic of the uplink channel resources, means for transmitting a feedback message in connection with one or more of the uplink channel resources and based at least in part on altering the behavior of the data layer traffic, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, communication resources may be allocated at a mini-slot granularity to enable reduced latency relative to full-slot granularity allocations. In such a communication system, a UE or a BS may transmit information using one or more symbols. When using transmission control protocol (TCP) for transmission in such a communication system, a throughput may be based at least in part on a latency that is achieved in the communication system. As a result, reducing a latency may cause an improvement in a TCP throughput.

A modem of a UE may receive TCP data (e.g., in a physical downlink shared channel (PDSCH)) on a downlink and may provide the TCP data to a stack of a host of the UE for processing. The UE (e.g., the host of the UE) may process the TCP data and may generate a feedback message (e.g., a TCP acknowledgement). The host may provide the feedback message to the modem and the UE may transmit the feedback message to the BS. The BS may route the feedback message to a TCP end point, which may use the feedback message for ensuring data reliability, enabling congestion control, and/or the like. To transmit the feedback message, the UE may transmit a scheduling request (SR) using physical uplink control channel (PUCCH) resources, receive a response (e.g., a physical downlink control channel (PDCCH) with an uplink grant) identifying one or more resources (e.g., one or more physical uplink shared channel (PUSCH) resources) for transmitting the feedback message, and may transmit the feedback messages using the one or more resources. However, a delay in waiting for available PUCCH resources to transmit the scheduling request as well as a delay in waiting to receive and use the allocation of PUSCH resources may result in excessive latency for TCP communication. This may result in a loss of throughput for TCP communication.

Some aspects described herein enable low-latency communication. For example, when a UE receives TCP data, on a downlink, that the UE is to acknowledge on an uplink, the UE may preemptively transmit a scheduling request (e.g., before the host has processed the TCP data and generated a feedback message) to a BS. In this case, the UE may receive information identifying an allocation of uplink resources for transmitting the feedback message at approximately the same time that the feedback message is ready for transmission. As a result, a TCP end point and the UE reduce a round trip time latency in TCP communications. Additionally, or alternatively, a UE-hosted modem data mover may synchronize data delivery of uplink traffic from a host to a modem (Data layer) with the modem's access stratum occasions to transmit uplink traffic. For example, the UE may use information regarding uplink traffic from a medium access control (MAC) layer to alter a behavior of uplink traffic at a data layer. In this case, by altering a behavior at the data layer, the UE may ensure that uplink traffic is available to enable use of a first available uplink transmission opportunity for transmitting a feedback message. In this way, the UE reduces a latency for transmitting the feedback message relative to maintaining static data layer behavior.

Figure 3:
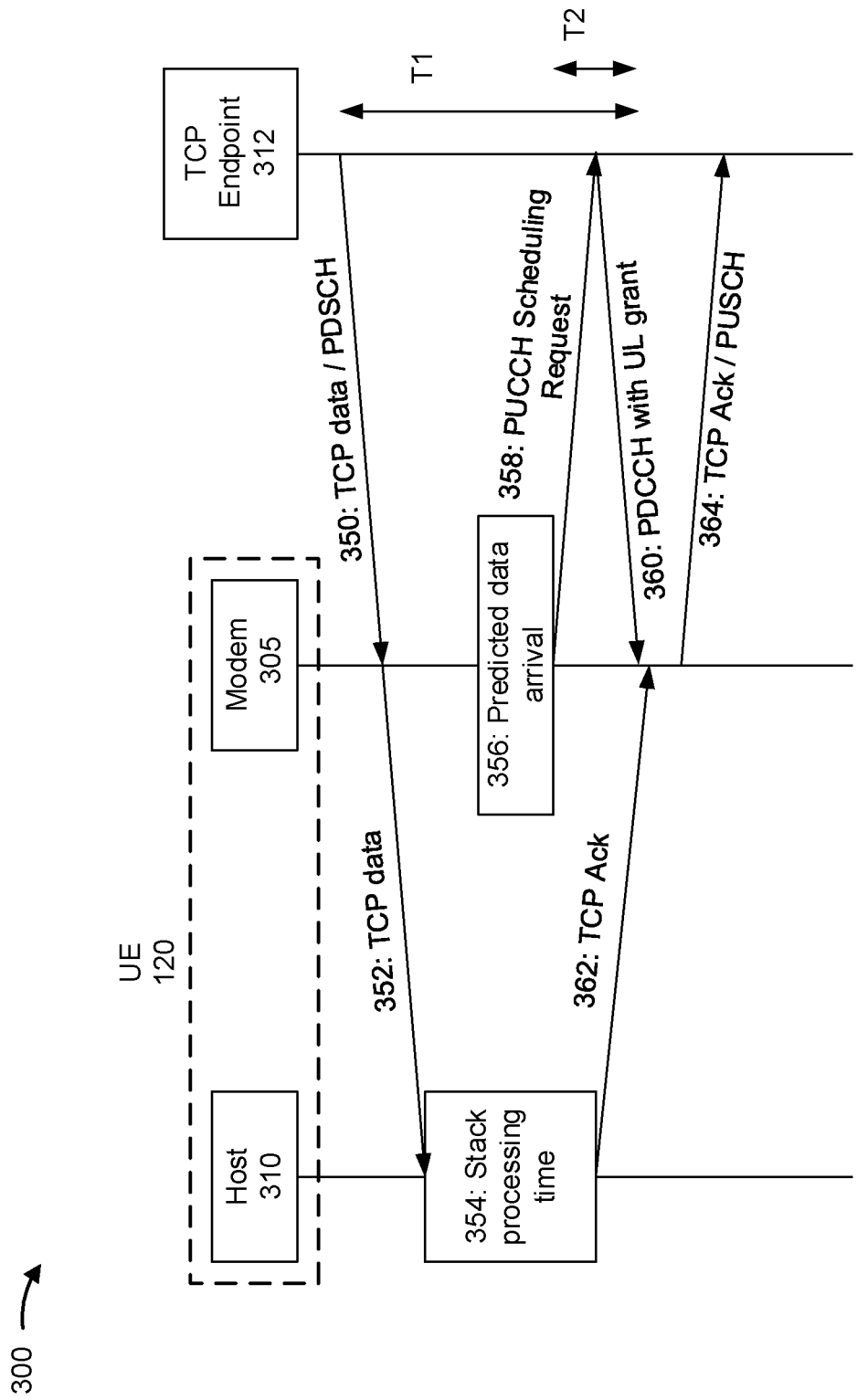
FIGS. 3-7B are diagrams illustrating examples of low-latency scheduling request configuration, in accordance with various aspects of the present disclosure.

FIG. 3 is a diagram illustrating an example 300 of low-latency scheduling request configuration, in accordance with various aspects of the present disclosure. As shown in FIG. 3, example 300 includes a BS 110 and a UE 120 (e.g., that includes a modem 305 and a host 310).

As further shown in FIG. 3, and by reference numbers 350 and 352, UE 120 may receive downlink data from TCP endpoint 312. For example, UE 120 may receive a PDSCH conveying TCP data at modem 305 and may pass the TCP data to host 310 for processing.

As further shown in FIG. 3, and by reference numbers 354, 356, and 358, during processing of the TCP data, UE 120 may initiate a grant request. For example, concurrent with host 310 processing the TCP data or a data layer moving data from host 310 to modem 305, modem 305 may transmit a PUCCH scheduling request to TCP endpoint 312. In this case, modem 305 preemptively (e.g., predictively, based at least in part on a prediction of a receipt of a future TCP feedback message) transmits the PUCCH scheduling request (e.g., before a TCP feedback message generated by host 310 is available to modem 305). In this case, the TCP ACK 362 is available in modem 305 shortly before an opportunity to transmit the TCP ACK (e.g., at 364). Hence, latency experienced by TCP ACK 362 is small, thereby reducing a latency associated with obtaining uplink resources for transmitting the TCP feedback message.

In some aspects, UE 120 may enable predictive (preemptive) scheduling request transmission based at least in part on an aspect of the TCP data. For example, as described in more detail below, UE 120 may enable predictive scheduling for a particular priority class of TCP data, a quality of service (QoS) requirement for the TCP data, and/or the like. Additionally, or alternatively, UE 120 may enable predictive scheduling when the TCP data is in a low-throughput or slow-start state. Although some aspects are described herein in terms of TCP data, other types of data that trigger feedback messages are possible, such as QUIC protocol data (e.g., user datagram protocol (UDP) data), real-time transmission data (e.g., extended reality use cases), low-latency gaming data, streaming data, ping data, and/or the like. In some aspects, UE 120 may determine to enable predictive scheduling request transmission for a particular type of protocol. For example, UE 120 may perform predictive scheduling request transmission for QUIC protocol data, but may forgo performing predictive scheduling request transmission for other UDP data. In some aspects, UE 120 may perform predictive scheduling request transmission based on the timing of moving downlink data from modem 305 to host 310.

In some aspects, UE 120 may determine a virtual data arrival time and may transmit the PUCCH scheduling request based at least in part on the virtual data arrival time. For example, UE 120 may determine a first amount of time between passing TCP data from modem 305 to host 310 and passing a TCP feedback message from host 310 to modem 305. Additionally, or alternatively, UE 120 may determine a second amount of time between transmitting a scheduling request to TCP endpoint 312 to request resources and receiving a response including an uplink grant of resources. In this case, based at least in part on the first amount of time and/or the second amount of time, UE 120 may determine a virtual data arrival time at which to preemptively transmit the scheduling request such that the uplink transmission opportunity (e.g., a PUSCH transmission opportunity) associated with a grant occurs shortly after arrival of TCP ACK 362 in modem 305.

In some aspects, UE 120 may determine the first amount of time, the second amount of time, and/or the like based at least in part on stored information regarding previous timings. For example, UE 120 may store information identifying the first amount of time for a set of previously received TCP data messages and may determine the first amount of time for a TCP data message based at least in part on an average for the first amount of time, a minimum for the first amount of time, a maximum for the first amount of time, and/or the like. Similarly, UE 120 may track the second amount of time on a per public land mobile network (PLMN) basis (e.g., per location, per tracking area cell, per cell identifier, per time of day, and/or the like), and may determine whether to preemptively transmit a scheduling request (or a time at which to preemptively transmit a scheduling request) based at least in part on tracking the second amount of time on a per PLMN basis. In some aspects, UE 120 may track the second amount of time based at least in part on an index of a PUCCH occasion that is to be used (PUCCH to grant delay may depend thereon, such as in a TDD configuration). In some aspects, UE 120 may determine whether a pre-scheduling mode is active for UE 120, and may disable preemptive transmission of a scheduling request when the pre-scheduling mode is active.

In some aspects, UE 120 may determine whether to transmit the scheduling request preemptively. For example, UE 120 may determine whether to transmit the scheduling request preemptively based at least in part on a predicted arrival time of the TCP feedback message, the scheduling request, and/or the like. In this case, UE 120 may determine a latency savings from preemptively requesting the uplink resources and may transmit the scheduling request preemptively based at least in part on the latency savings satisfying a threshold. For example, when the first time (e.g., associated with receiving the TCP feedback) is less than a threshold (e.g., low-latency host 310 processing), UE 120 may forgo predictive scheduling request transmission.

In some aspects, UE 120 may determine whether to transmit the scheduling request preemptively based at least in part on a characteristic of the TCP data. For example, UE 120 may track a delay associated with generating a feedback message and/or receiving a grant on a per flow identifier basis (e.g., a per IP address, source address, target address, port address, protocol, connection, and/or the like basis). In this case, UE 120 may determine whether to preemptively transmit the scheduling request based at least in part on a latency savings for a flow identifier matching the TCP data. Additionally, or alternatively, UE 120 may determine whether to preemptively transmit the scheduling request based at least in part on a level of PDSCH traffic, a latency associated with host 310 (e.g., UE 120 may disable preemptive scheduling request transmission for a host 310 with a wide latency spread), and/or the like.

As further shown in FIG. 3, and by reference numbers 360 and 362, UE 120 may receive a grant of uplink resources and may generate a feedback message to transmit using the uplink resources. For example, based at least in part on preemptively transmitting the scheduling request, modem 305 may receive a PDCCH including an uplink grant from TCP endpoint 312 before receiving an indication to transmit a TCP acknowledgement from host 310. Additionally, or alternatively, modem 305 may receive the uplink grant within a threshold amount of time of receiving the TCP acknowledgement. For example, based at least in part on preemptively transmitting the scheduling request, modem 305 may receive the uplink grant less than a threshold amount of time after receiving the TCP acknowledgement. In this way, UE 120 and TCP endpoint 312 reduce a latency to transmit the TCP acknowledgement, relative to requesting the uplink grant after receiving the TCP acknowledgement. Moreover, based at least in part on reducing the latency, UE 120 enables a discontinuous reception activity time to expire earlier (than if latency were longer), thereby reducing a utilization of power resources.

As further shown in FIG. 3, and by reference number 364, UE 120 may transmit a TCP feedback message to TCP endpoint 312. For example, UE 120 (e.g., modem 305) may transmit a TCP acknowledgement to TCP endpoint 312 using PUSCH resources allocated in an uplink grant received from TCP endpoint 312.

As indicated above, FIG. 3 is provided as an example. Other examples may differ from what is described with respect to FIG. 3.

Figure 4:
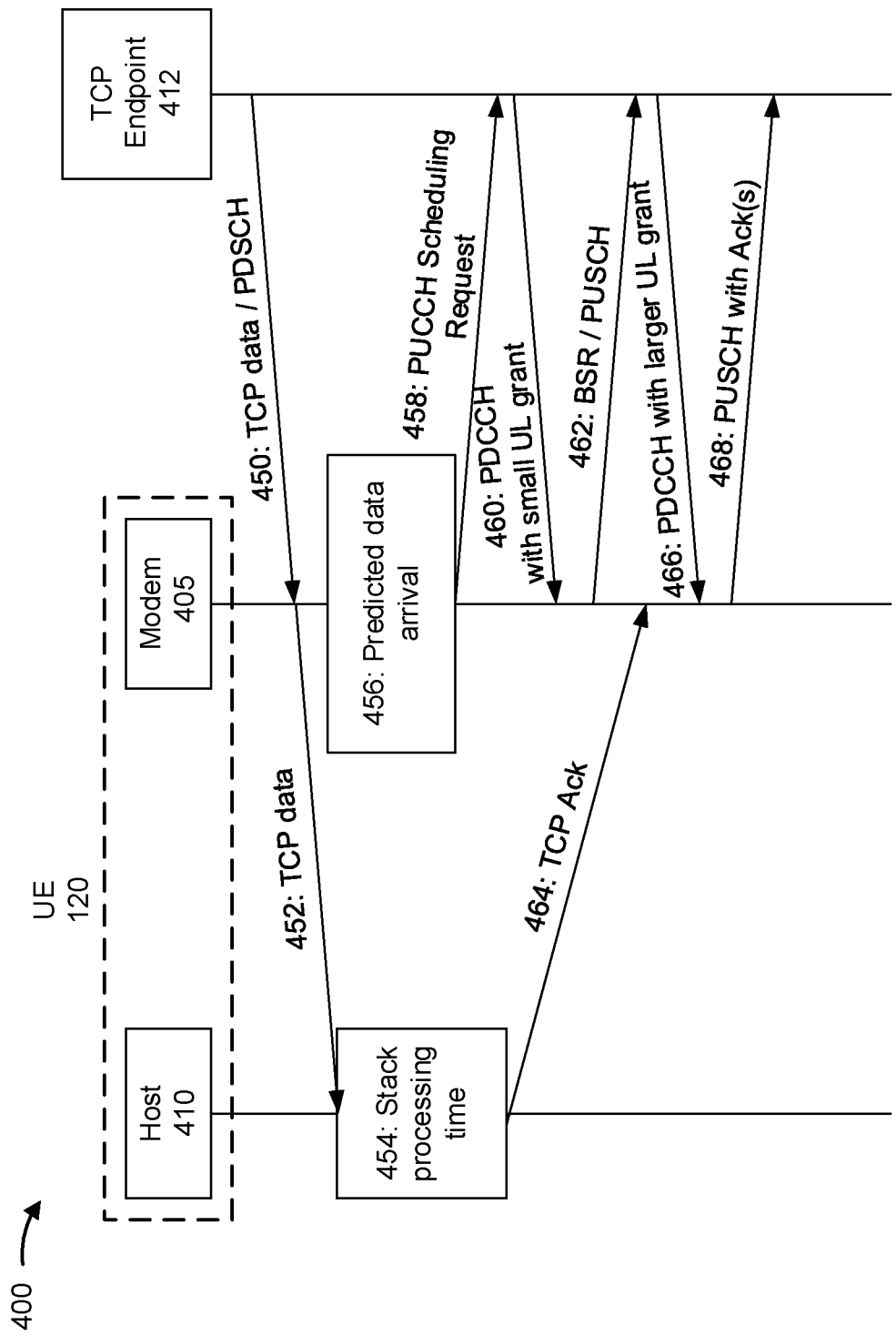

FIG. 4 is a diagram illustrating an example 400 of low-latency scheduling request configuration, in accordance with various aspects of the present disclosure. As shown in FIG. 4, example 400 includes a TCP endpoint 412 and a UE 120 (e.g., that includes a modem 405 and a host 410).

As further shown in FIG. 4, and by reference numbers 450 and 452, UE 120 may receive downlink data from TCP endpoint 412. For example, UE 120 may receive a PDSCH conveying TCP data at modem 405 and may pass the TCP data to host 410 for processing.

As further shown in FIG. 4, and by reference numbers 454, 456, and 458, during processing of the TCP data, UE 120 may initiate a grant request. For example, concurrent with host 410 processing the TCP data, modem 405 may transmit a PUCCH scheduling request to TCP endpoint 412.

As further shown in FIG. 4, and by reference number 460, UE 120 may receive a grant of uplink resources. For example, based at least in part on preemptively transmitting the scheduling request, modem 405 may receive a PDCCH including an uplink grant from TCP endpoint 412 before receiving an indication to transmit a TCP acknowledgement from host 410. In this case, the uplink grant may be smaller than the TCP acknowledgement from host 410. For example, TCP endpoint 412 may grant fewer resources than are needed to transmit the TCP acknowledgement (e.g., all available TCP acknowledgments). In this case, as shown by reference number 462, UE 120 may transmit a pseudo-acknowledgement using resources of the uplink grant. For example, UE 120 may transmit previously transmitted data, a retransmission of radio link control (RLC) data, data with a false logical channel identifier (LCID), MAC padding, and/or the like. In some aspects, UE 120 may include a request for another uplink grant in a PUSCH transmission using the resources of the uplink grant. For example, UE 120 may determine that a first uplink grant is less than a threshold size for transmitting the TCP acknowledgement and may include a request for a second uplink grant in resources of the first uplink grant. In some aspects, UE 120 may transmit a buffer status report (BSR) with the PUSCH.

As further shown in FIG. 4, and by reference numbers 464, 466, and 468, UE 120 may receive another uplink grant and may transmit the TCP feedback message to TCP endpoint 412 in resources of the other uplink grant. For example, UE 120 (e.g., modem 405) may transmit a TCP acknowledgement to TCP endpoint 412 using PUSCH resources allocated in an uplink grant received from TCP endpoint 412. In some aspects, UE 120 may consolidate a plurality of feedback messages in the resources of the other uplink grant. For example, when modem 405 receives another feedback message from host 410 before receiving the other uplink grant, modem 405 may consolidate the feedback message and the other feedback message for transmission using a single uplink grant.

As indicated above, FIG. 4 is provided as an example. Other examples may differ from what is described with respect to FIG. 4.

Figure 5:
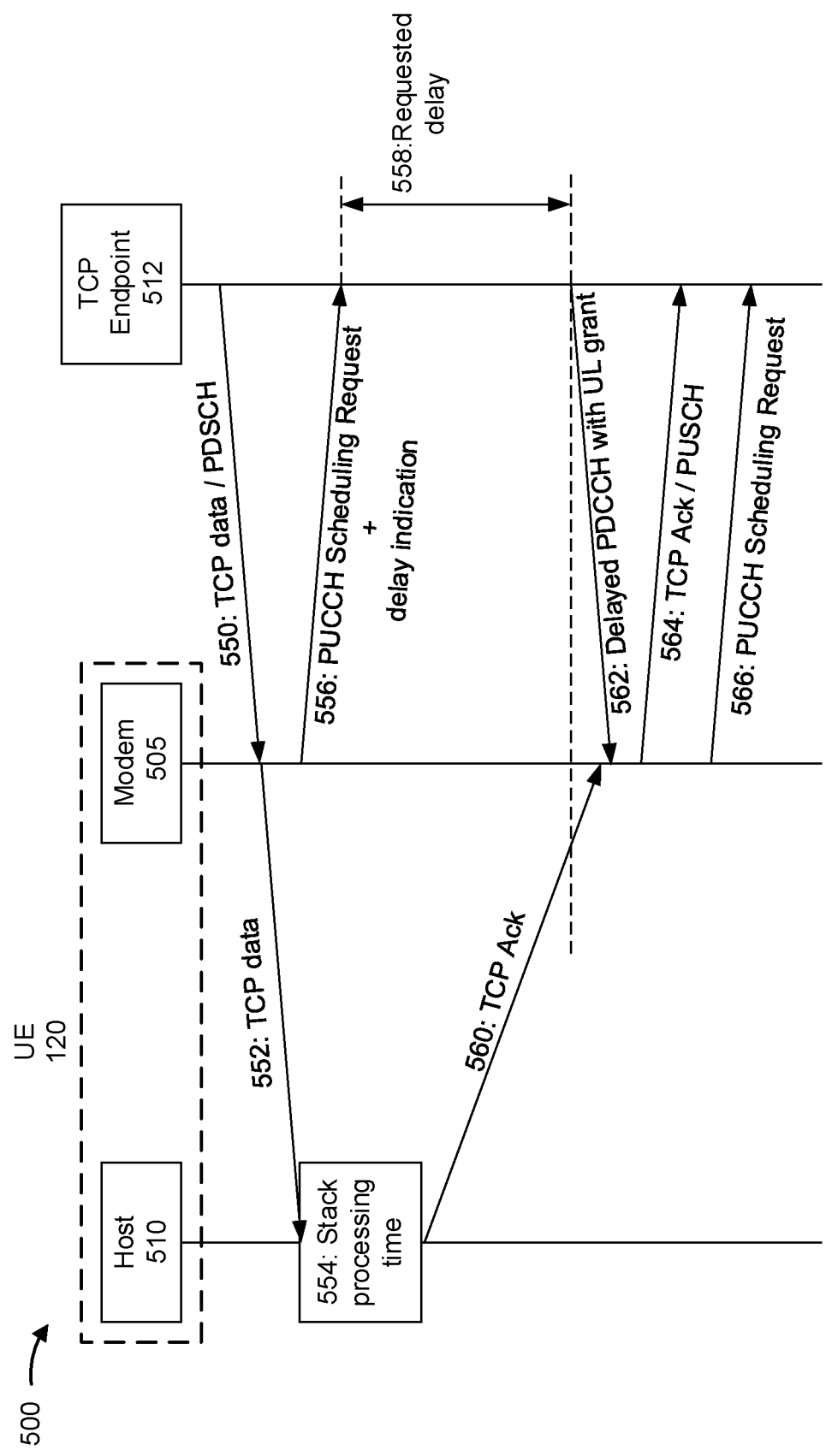

FIG. 5 is a diagram illustrating an example 500 of low-latency scheduling request configuration, in accordance with various aspects of the present disclosure. As shown in FIG. 5, example 500 includes a TCP endpoint 512 and a UE 120 (e.g., that includes a modem 505 and a host 510).

As further shown in FIG. 5, and by reference numbers 550 and 552, UE 120 may receive downlink data from TCP endpoint 512. For example, UE 120 may receive a PDSCH conveying TCP data at modem 505 and may pass the TCP data to host 510 for processing.

As further shown in FIG. 5, and by reference numbers 554 and 556, during processing of the TCP data, UE 120 may initiate a grant request. For example, concurrent with host 510 processing the TCP data, modem 505 may transmit a PUCCH scheduling request to TCP endpoint 512. In some aspects, UE 120 may include a delay indication in the grant request. For example, UE 120 may transmit the scheduling request and include information indicating a time at which TCP feedback information is expected. In this case, as shown by reference number 558, TCP endpoint 512 may delay for a threshold period of time, in accordance with the delay indication, before transmitting a scheduling request. In some aspects, the delay indication may indicate a delay from receipt of the PUCCH at TCP endpoint 512 to transmission of a grant to UE 120. Additionally, or alternatively, the delay indication may indicate a delay starting from transmission of the PUCCH, ending at receipt of the grant, and/or the like. In this way, TCP endpoint 512 may increase a scheduling request interval while still providing opportunities for UE 120 to transmit the scheduling request. In other words, TCP endpoint 512 may provide less frequent scheduling request transmission opportunities, but UE 120 may include the delay indication to enable use of an earlier scheduling request transmission opportunity (than shown in FIGS. 3 and 4), while still receiving the uplink resources at the same time as the TCP feedback message. In this way, TCP endpoint 512 and UE 120 avoid a mismatch whereby UE 120 transmits the scheduling request too early and the TCP feedback message is not ready when granted resources occur, or too late whereby the TCP feedback message is delayed until the grated resources occur. In this way, TCP endpoint 512 and UE 120 enable reduced uplink overhead associated with providing frequency scheduling request transmission opportunities.

As further shown in FIG. 5, and by reference numbers 560 and 562, UE 120 may receive a grant of uplink resources at approximately the same time as the TPC feedback message is ready for transmission. As shown by reference numbers 564 and 566, UE 120 may transmit the TCP feedback message using the uplink resources. In some aspects, UE 120 may transmit another PUCCH scheduling request after transmitting the PUSCH resources (e.g., to prepare for acknowledging another PDSCH with TCP data).

As indicated above, FIG. 5 is provided as an example. Other examples may differ from what is described with respect to FIG. 5.

Figure 6A:
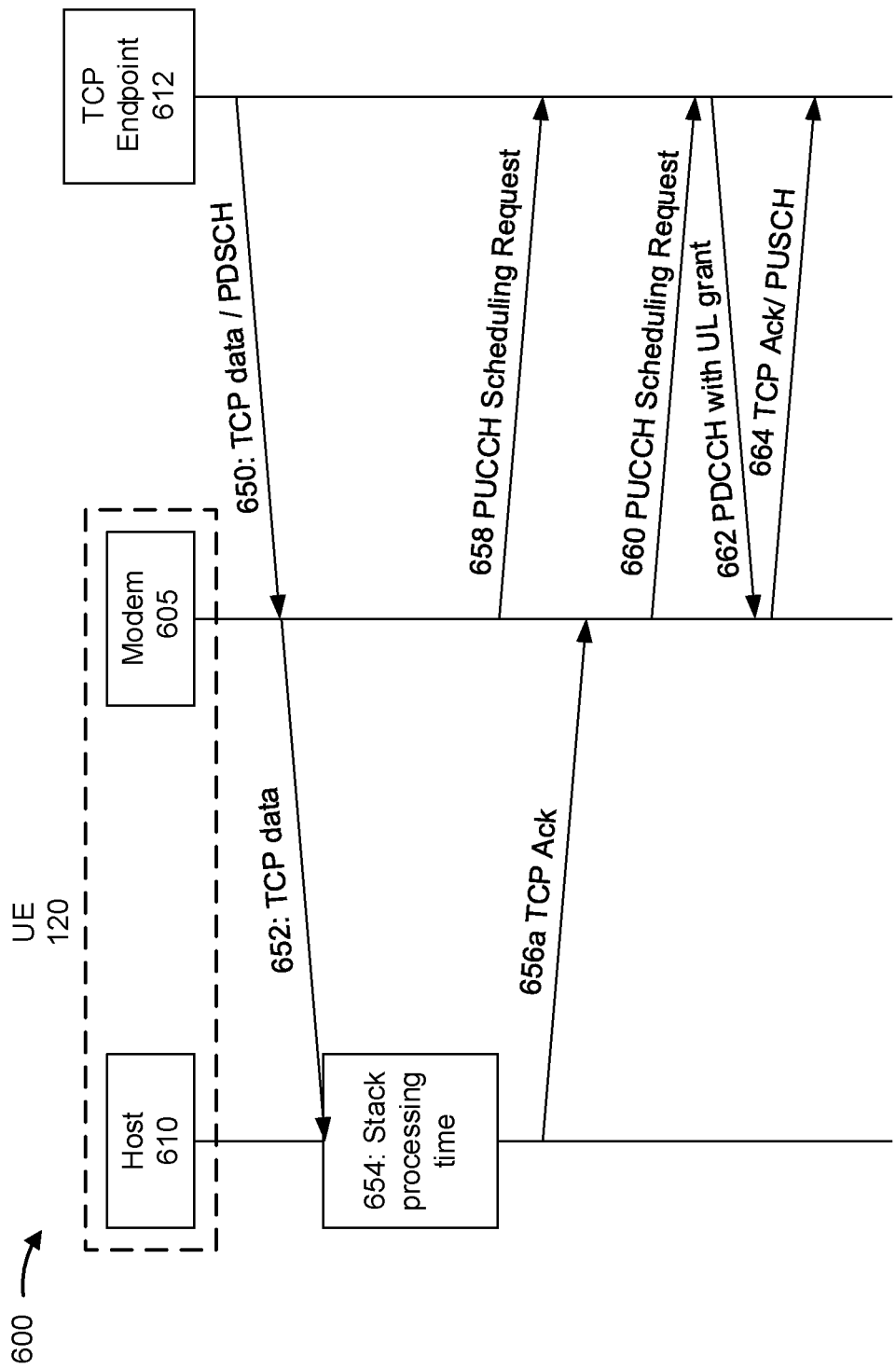
Figure 6B:
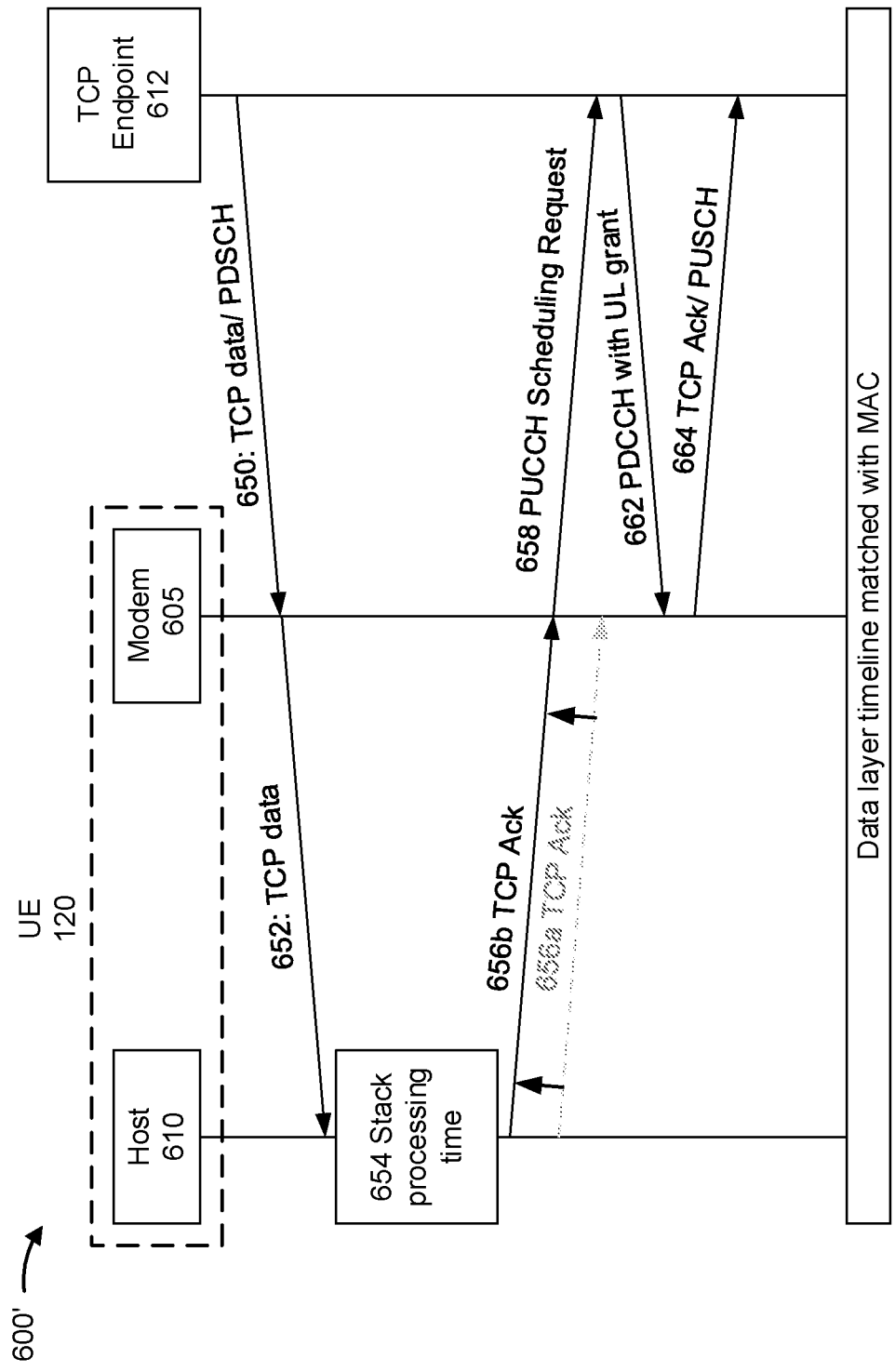

FIGS. 6A and 6B are diagrams illustrating examples 600/600' of low-latency scheduling request configuration, in accordance with various aspects of the present disclosure. As shown in FIGS. 6A and 6B, examples 600/600' include a TCP endpoint 612 and a UE 120 (e.g., that includes a modem 605 and a host 610).

As further shown in FIGS. 6A and 6B, and by reference numbers 650 and 652, UE 120 may receive downlink data from TCP endpoint 612. For example, UE 120 may receive a PDSCH conveying TCP data at modem 605 and may pass the TCP data to host 610 for processing.

As further shown in FIG. 6A, and by reference numbers 654, 656a, and 658, during processing of the TCP data, a PUCCH scheduling request opportunity (or a configured grant or semi persistent scheduling (SPS) occurrence) may occur, resulting in a TCP feedback message being received at modem 605 after the PUCCH scheduling request opportunity. As a result, UE 120 delays until another scheduling request opportunity, as shown by reference numbers 660, 662, and 664, before transmitting a scheduling request to request an uplink grant for transmitting the TCP feedback message. In contrast, as shown in FIG. 6B, and by reference number 656b, UE 120 may alter a behavior of a data layer of UE 120 to preemptively deliver the TCP feedback message from host 610 to modem 605 before the PUCCH scheduling request opportunity.

In this case, a medium access control (MAC) layer of UE 120 may identify, to a data layer of UE 120, a set of parameters relating to an uplink channel to enable pulling of the TCP feedback message or other uplink latency sensitive traffic. For example, the MAC layer may identify a set of PUCCH scheduling request occasions, SPS occasions, an expiration of a periodic buffer status report (BSR) timer (e.g., indicating when UE 120 has an opportunity to indicate an updated size of an uplink buffer), an expected time at which the MAC layer will drain the uplink buffer (e.g., when the uplink buffer drains, TCP endpoint 612 may halt uplink grants causing latency in transmitting the TCP feedback message), and/or the like. In this case, based at least in part on the information regarding the uplink channel, UE 120 may alter a behavior of the data layer to preemptively deliver uplink traffic (e.g., the TCP feedback message) to the MAC layer, to enable the MAC layer to transmit the TCP feedback message at an earlier time. In some aspects, to achieve preemptive delivery, UE 120 may commit downlink data earlier than may have otherwise occurred, may commit the UL data earlier than may have otherwise occurred, may boost a CPU clock to accelerate processing time, may prevent entering a sleep state of one or more hardware components, and/or the like. In this way, UE 120 enables use of the PUCCH scheduling request opportunity indicated by reference number 658 for requesting an uplink grant, rather than the PUCCH scheduling request opportunity indicated by reference number 660 of FIG. 6A. In this way, UE 120 enables reduced latency for obtaining an uplink grant to transmit the TCP feedback message without predictive (preemptive) scheduling request transmission As further shown in FIGS. 6A and 6B, and by reference numbers 660 and 662, UE 120 may receive a grant of uplink resources. For example, as shown in FIGS. 6A and 6B, by pulling the TCP acknowledgement message to modem 605 preemptively and using the PUCCH scheduling request opportunity of reference number 658, rather than the TCP scheduling request opportunity of reference number 660, UE 120 reduces a latency associated with transmitting the TCP acknowledgement message.

In some aspects, UE 120 may use information regarding a connected discontinuous reception (CDRX) mode to control when to have the TCP acknowledgement message available for transmission. For example, when a delay between a downlink message and uplink response traffic is greater than an inactivity timer for the CDRX mode, a medium access control (MAC) layer of UE 120 may indicate, to a data layer of UE 120, that the CDRX mode is configured. Additionally, or alternatively, the MAC layer may indicate a period of time that a MAC entity will remain in an awake state, a period of time when the MAC entity will be in a sleep state, and a next period of time, after the sleep state, when the MAC entity will be in an awake state again. In this case, the data layer may configure a timing of the TCP acknowledgement message such that the TCP acknowledgement message arrives at modem 605 for transmission at a MAC awake time. In this case, to achieve time synchronization with the MAC awake time, UE 120 may pull the TCP acknowledgement message to modem 605 preemptively. Alternatively, UE 120 may delay the TCP acknowledgement message until a next on duration. In this way, UE 120 enables use of a CDRX mode with reduced power consumption relative to waking up the MAC entity when the TCP acknowledgement message is ready for transmission. In some aspects, the MAC entity may alter a value of a discontinuous reception (DRX) timer (e.g., a DRX inactivity timer) associated with the CDRX mode based at least in part on a latency associated with communication between mode 605 and host 610.

As indicated above, FIGS. 6A and 6B are provided as examples. Other examples may differ from what is described with respect to FIGS. 6A and 6B.

Figure 7A:
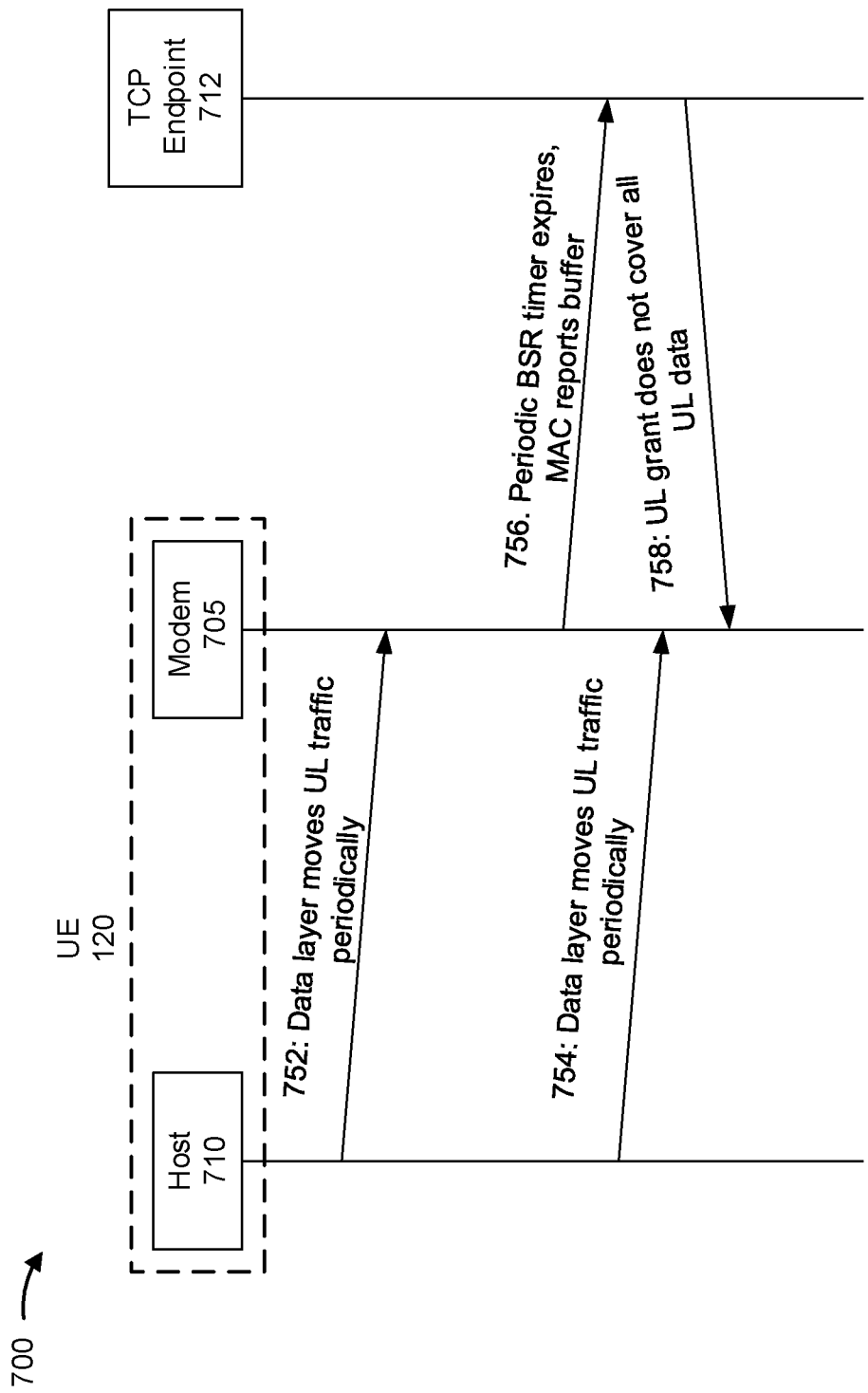
Figure 7B:
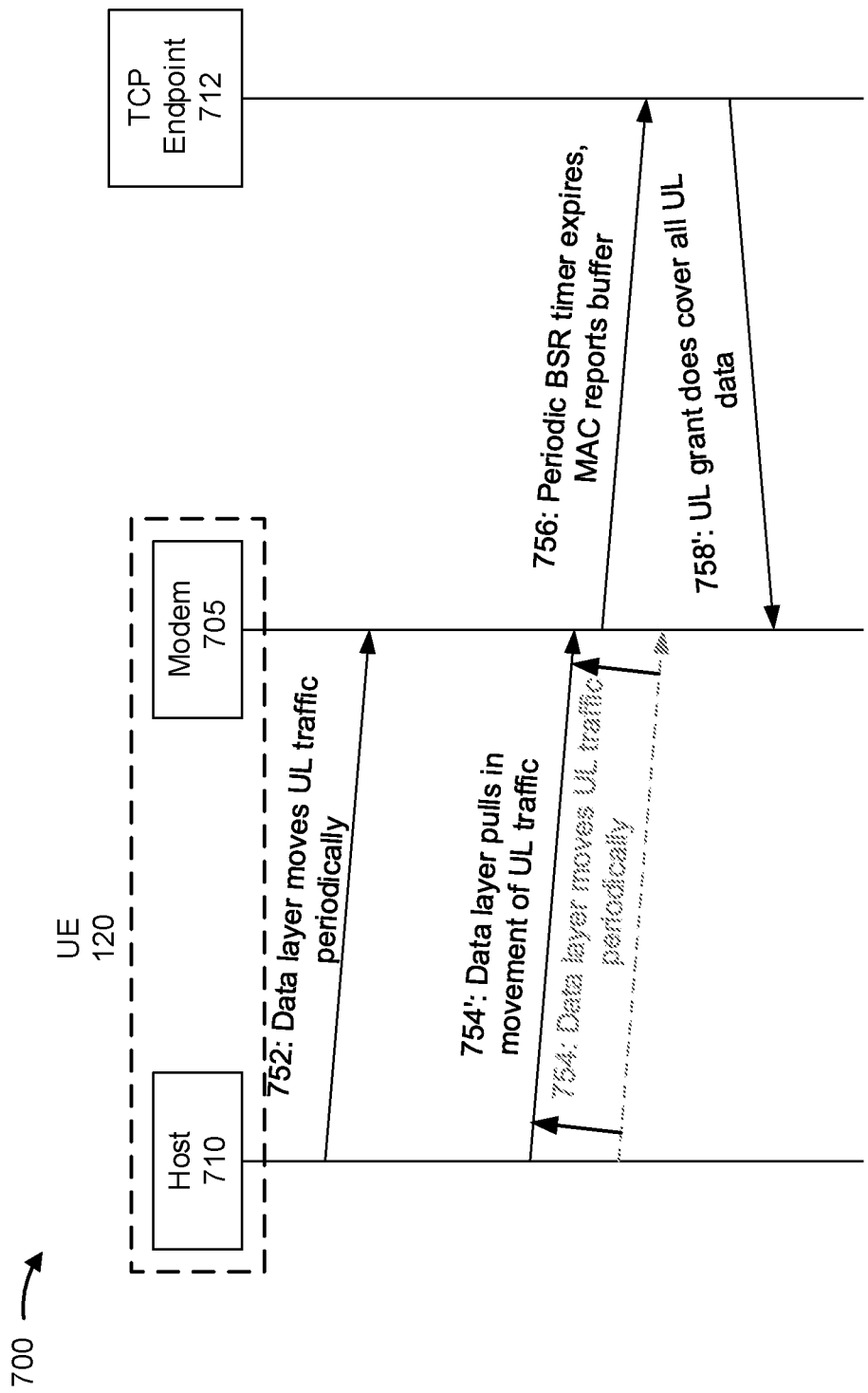

FIGS. 7A and 7B are diagrams illustrating examples 700/700' of low-latency scheduling request configuration, in accordance with various aspects of the present disclosure. As shown in FIGS. 7A and 7B, examples 700/700' include a TCP endpoint 712 and a UE 120 (e.g., that includes a modem 705 and a host 710).

As further shown in FIG. 7A, and by reference numbers 752 and 754, host 710 of UE 120 may periodically process uplink traffic and push the uplink traffic to modem 705 of UE 120. In this case, modem 705 receives the uplink traffic after a BSR update opportunity of reference number 756. As a result, UE 120 delays reporting the uplink traffic to TCP endpoint 712 until a subsequent BSR update opportunity. In this case, as shown by reference number 758, UE 120 may receive an uplink grant from TCP endpoint 712 that does not include resources for the uplink traffic, which may add delay until transmission.

In contrast, as shown in FIG. 7B, and by reference number 754', in some aspects, UE 120 may preemptively provide the uplink traffic from host 710 to modem 705 preemptively, based at least in part on information indicating when the BSR update opportunity of reference number 756a is to occur. For example, based at least in part on layer 2 (L2) information regarding a radio bearer, a subscription identifier, a PUCCH scheduling request schedule, a buffer status report timer configuration, and/or the like, UE 120 may determine to alter a behavior of a data layer to pull uplink traffic from the data layer for transmission. In some aspects, a medium access control (MAC) layer of UE 120 may broadcast semi-static values for one or more parameters during a radio resource control (RRC) reconfiguration procedure to enable data layer alteration behavior. Additionally, or alternatively, UE 120 may use a request message to the MAC layer to cause the MAC layer to provide a response message with one or more values for one or more parameters. In some aspects, UE 120 (e.g., at L2) may determine whether to alter a data layer behavior based at least in part on an uplink allocation, a downlink allocation, a time of a first available uplink slot after expiration of a buffer status report timer, and/or the like.

In some aspects, UE 120 may define a time parameter representing an amount of time between providing a buffer status report layer from L2 to a first available uplink resource for transmitting a buffer status report. In this case, UE 120 may alter the behavior at the data layer when uplink traffic can be pulled to L2 before the first available uplink resource for transmitting the buffer status report. In some aspects, UE 120 (e.g., at L2) may provide a set of indications indicating whether an RRC reconfiguration invalidates previously provided parameter values, whether a buffer status report expiration value is to be invalidated, and/or the like.

In this case, UE 120 may report the uplink traffic in the BSR update opportunity indicated by reference number 756a. As a result, as shown by reference number 758', UE 120 may receive an uplink grant from TCP endpoint 712 that includes resources for the uplink traffic. In this way, using dynamic data layer operation as shown in FIG. 7B, UE 120 reduces a latency for transmitting uplink traffic relative to static data layer operation as shown in FIG. 7A.

As indicated above, FIGS. 7A and 7B are provided as examples. Other examples may differ from what is described with respect to FIGS. 7A and 7B.

Figure 8:
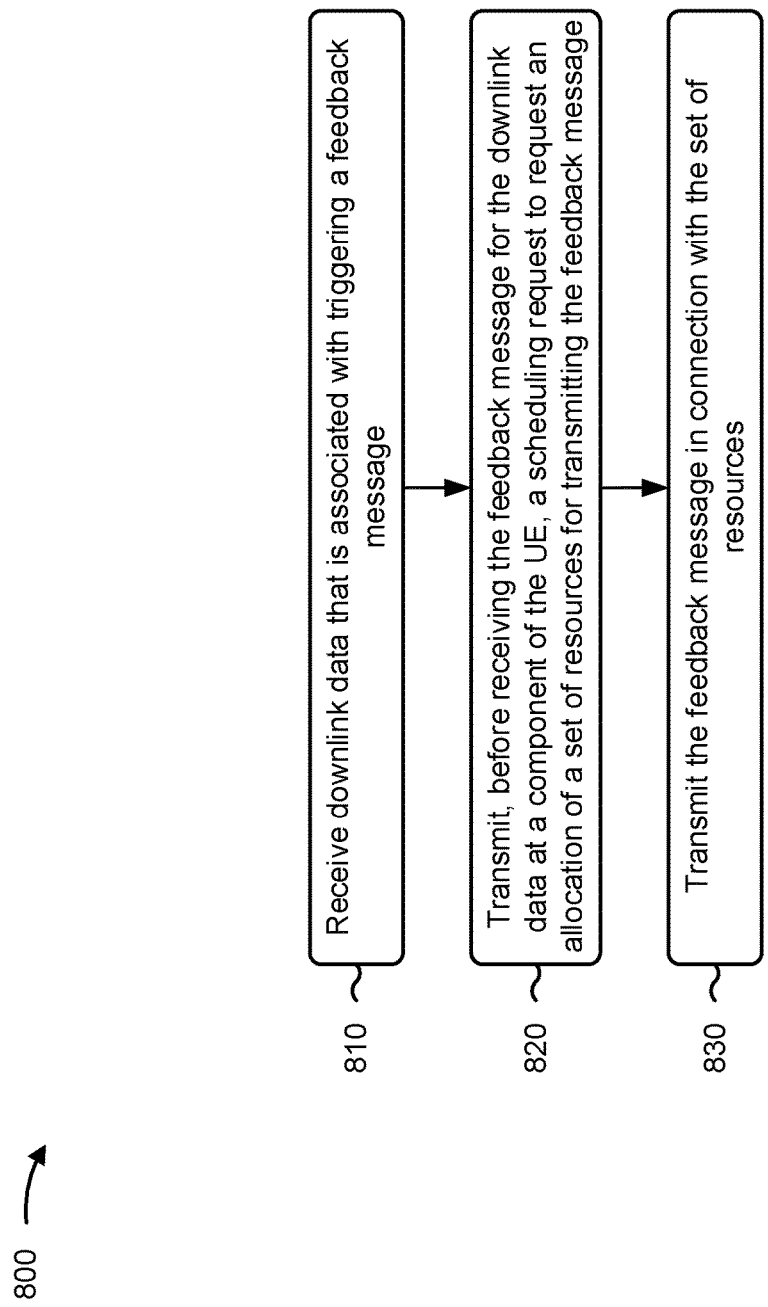
FIGS. 8-9 are diagrams illustrating example processes performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with low-latency scheduling request configuration.

As shown in FIG. 8, in some aspects, process 800 may include receiving downlink data that is associated with triggering a feedback message (block 810). For example, the UE (e.g., using receive processor 258, transmit processor 264, controller/processor 280, memory 282, and/or the like) may receive downlink data that is associated with triggering a feedback message for transmission on an uplink, as described above.

As further shown in FIG. 8, in some aspects, process 800 may include transmitting, before receiving the feedback message for the downlink data at a component of the UE, a scheduling request to request an allocation of a set of resources for transmitting the feedback message (block 820). For example, the UE (e.g., using receive processor 258, transmit processor 264, controller/processor 280, memory 282, and/or the like) may transmit, before receiving (e.g., at a modem) the feedback message for the downlink data at a component of the UE, a scheduling request to request an allocation of a set of resources for transmitting the feedback message, as described above.

As further shown in FIG. 8, in some aspects, process 800 may include transmitting the feedback message in connection with the set of resources (block 830). For example, the UE (e.g., using receive processor 258, transmit processor 264, controller/processor 280, memory 282, and/or the like) may transmit the feedback message in connection with the set of resources, as described above.

Process 800 may include additional aspects, such as any single aspect or any combination of aspects described below and/or in connection with one or more other processes described elsewhere herein.

In a first aspect, transmitting the scheduling request includes transmitting the scheduling request based at least in part on the predicted arrival time of the feedback message.

In a second aspect, alone or in combination with the first aspect, the scheduling request is transmitted at a predicted scheduling request time, wherein the predicted scheduling request time is based at least in part on at least one of: a predicted time between receiving the downlink data and receiving the feedback message, or a predicted time between requesting the allocation of the set of resources and receiving a response granting the allocation of the set of resources.

In a third aspect, alone or in combination with one or more of the first and second aspects, transmitting the scheduling request includes transmitting the scheduling request before receiving a feedback message for the downlink data based at least in part on the flow identifier.

In a fourth aspect, alone or in combination with one or more of the first through third aspects, the flow identifier is based at least in part on at least one of: a source address, a destination address, a bearer identifier, a flow identifier, a quality of service identifier, a codepoint, a port, or a protocol.

In a fifth aspect, alone or in combination with one or more of the first through fourth aspects, process 800 includes determining that the set of resources does not satisfy a threshold size for transmitting the feedback message; transmitting a buffer status report and pseudo-feedback message using the set of resources, wherein the buffer status is reporting includes information identifying a size corresponding to the feedback message; and transmitting the feedback message using another set of allocated resources.

In a sixth aspect, alone or in combination with one or more of the first through fifth aspects, transmitting the scheduling request includes transmitting the scheduling request before receiving a feedback message for the downlink data based at least in part on the public land mobile network identifier.

In a seventh aspect, alone or in combination with one or more of the first through sixth aspects, transmitting the scheduling request comprises: transmitting the scheduling request before receiving a feedback message for the downlink data based at least in part on determining that the pre-scheduling mode is active.

In an eighth aspect, alone or in combination with one or more of the first through seventh aspects, transmitting the scheduling request comprises: transmitting the scheduling request before receiving a feedback message for the downlink data based at least in part on determining that processing the downlink data to generate the feedback message is associated with the threshold round-trip delay.

In a ninth aspect, alone or in combination with one or more of the first through eighth aspects, process 800 includes transmitting the scheduling request before receiving a feedback message for the downlink data based at least in part on a driver characteristic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
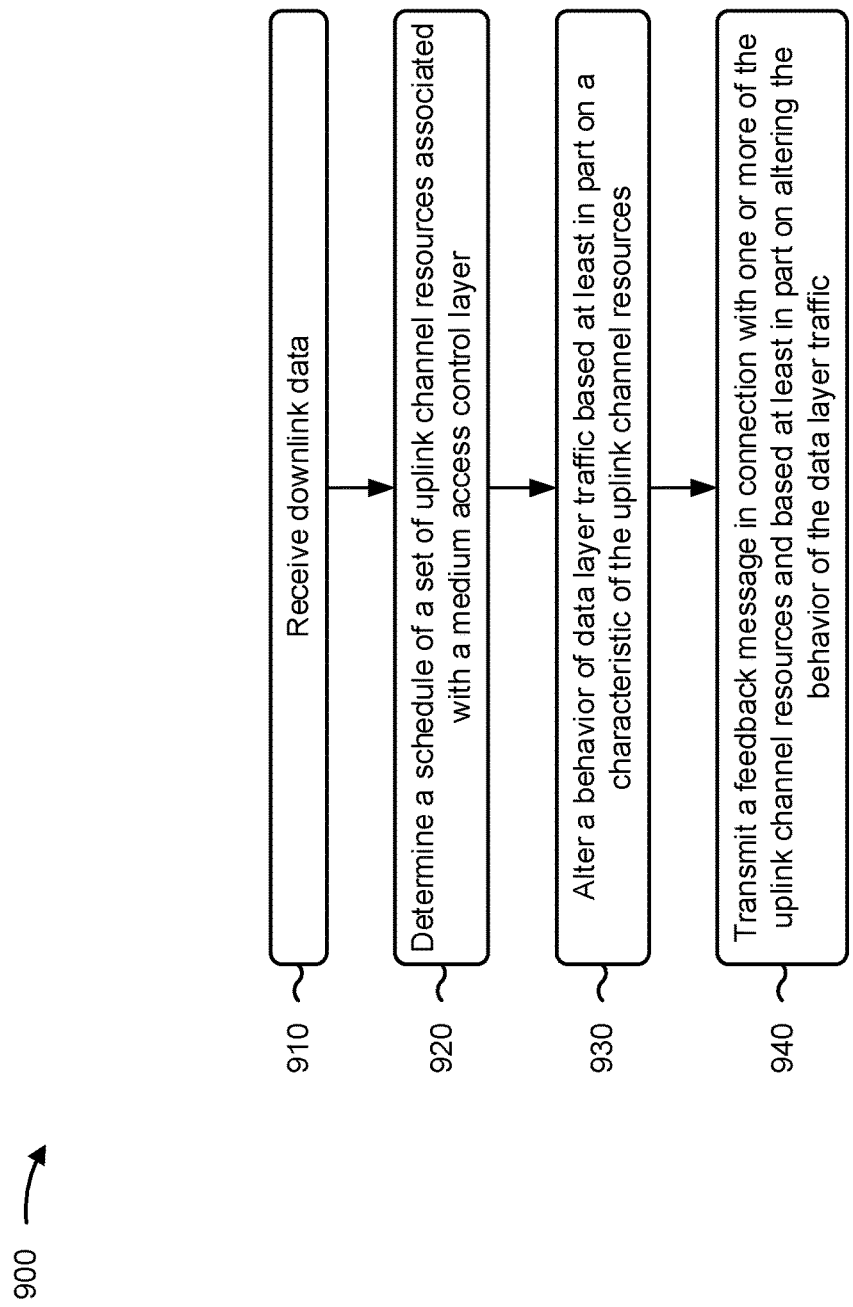

FIG. 9 is a diagram illustrating an example process 900 performed, for example, by a UE, in accordance with various aspects of the present disclosure. Example process 900 is an example where the UE (e.g., UE 120 and/or the like) performs operations associated with low-latency scheduling request configuration.

As shown in FIG. 9, in some aspects, process 900 may include receiving downlink data (block 910). For example, the UE (e.g., using receive processor 258, transmit processor 264, controller/processor 280, memory 282, and/or the like) may receive downlink data, as described above.

As further shown in FIG. 9, in some aspects, process 900 may include determining a schedule of a set of uplink channel resources associated with a medium access control layer (block 920). For example, the UE (e.g., using receive processor 258, transmit processor 264, controller/processor 280, memory 282, and/or the like) may determine a schedule of a set of uplink channel resources associated with a medium access control layer, as described above.

As further shown in FIG. 9, in some aspects, process 900 may include altering a behavior of data layer traffic based at least in part on a characteristic of the uplink channel resources (block 930). For example, the UE (e.g., using receive processor 258, transmit processor 264, controller/processor 280, memory 282, and/or the like) may alter a behavior of data layer traffic based at least in part on a characteristic of the uplink channel resources, as described above.

As further shown in FIG. 9, in some aspects, process 900 may include transmitting a feedback message in connection with one or more of the uplink channel resources and based at least in part on altering the behavior of the data layer traffic (block 940). For example, the UE (e.g., using receive processor 258, transmit processor 264, controller/processor 280, memory 282, and/or the like) may transmit a feedback message in connection with one or more of the uplink channel resources and based at least in part on altering the behavior of the data layer traffic, as described above.

Process 900 may include additional aspects, such as any single aspect or any combination of aspects described below and/or in connection with one or more other processes described elsewhere herein.

In a first aspect, the downlink data is associated with triggering the feedback message.

In a second aspect, alone or in combination with the first aspect, the set of uplink channel resources is associated with information identifying at least one of: a set of physical uplink control channel scheduling request occasions, one or more semi-persistent scheduling occasions, one or more configured grants, and/or the like available to a MAC layer, an expiration of a periodic buffer status reporting timer, or a predicted medium access control uplink buffer drain time.

In a third aspect, alone or in combination with one or more of the first and second aspects, altering the behavior of the data layer traffic includes altering the behavior of the data layer traffic based at least in part on identifying the transmission opportunity.

In a fourth aspect, alone or in combination with one or more of the first through third aspects, altering the behavior of the data layer traffic includes causing downlink data to be delivered from the medium access control layer to a host before a scheduled delivery time.

In a fifth aspect, alone or in combination with one or more of the first through fourth aspects, altering the behavior of the data layer traffic includes causing a change to a data processing time of the downlink data at a host.

In a sixth aspect, alone or in combination with one or more of the first through fifth aspects, altering the behavior of the data layer traffic includes causing uplink data to be delivered from a host to the medium access control layer before a scheduled delivery time.

In a seventh aspect, alone or in combination with one or more of the first through sixth aspects, altering the behavior of the data layer traffic includes altering the behavior of the data layer traffic based at least in part on at least one of: a timing of an uplink occasion, whether a low-latency request is active, a status of a transport layer connection, or a status of a bearer.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving downlink data that is associated with triggering a feedback message; and
   transmitting, before receiving the feedback message for the downlink data at a component of the UE, a scheduling request to request an allocation of a set of resources for transmitting the feedback message.

2. The method of claim 1, further comprising:
   transmitting the feedback message in connection with the set of resources.

3. The method of claim 2, further comprising:
   transmitting the scheduling request at a predicted scheduling request time, wherein the predicted scheduling request time is based at least in part on at least one of:
   a predicted time between receiving the downlink data and receiving the feedback message, or
   a predicted time between requesting the allocation of the set of resources and receiving a response granting the allocation of the set of resources.

4. The method of claim 1, further comprising:
   determining a predicted arrival time of the feedback message; and
   wherein transmitting the scheduling request comprises:
   transmitting the scheduling request based at least in part on the predicted arrival time of the feedback message.

5. The method of claim 1, further comprising:
   determining a flow identifier for the downlink data; and
   wherein transmitting the scheduling request comprises:
   transmitting the scheduling request before receiving the feedback message for the downlink data based at least in part on the flow identifier.

6. The method of claim 5, wherein the flow identifier is based at least in part on at least one of:
   a source address,
   a destination address,
   a bearer identifier,
   a quality of service identifier,
   a codepoint,
   a port, or
   a protocol.

7. The method of claim 1, further comprising:
   determining that the set of resources does not satisfy a threshold size for transmitting the feedback message;
   transmitting a buffer status report and pseudo-feedback message using the set of resources, wherein the buffer status report includes information identifying a size corresponding to the feedback message and does not include feedback information; and
   transmitting the feedback message using another set of allocated resources.

8. The method of claim 1, further comprising:
   determining a public land mobile network identifier in connection with the downlink data; and
   wherein transmitting the scheduling request comprises:
   transmitting the scheduling request before receiving the feedback message for the downlink data based at least in part on the public land mobile network identifier.

9. The method of claim 1, further comprising:
   determining that a pre-scheduling mode is active; and
   wherein transmitting the scheduling request comprises:
   transmitting the scheduling request before receiving the feedback message for the downlink data based at least in part on determining that the pre-scheduling mode is not active.

10. The method of claim 1, further comprising:
    determining that processing the downlink data to generate the feedback message is associated with a threshold round-trip delay; and
    wherein transmitting the scheduling request comprises:
    transmitting the scheduling request before receiving a feedback message for the downlink data based at least in part on determining that processing the downlink data to generate the feedback message is associated with the threshold round-trip delay.

11. The method of claim 1, transmitting the scheduling request comprises:
    transmitting the scheduling request before receiving the feedback message for the downlink data based at least in part on a driver characteristic.

12. A method of wireless communication performed by a user equipment (UE), comprising:
- receiving downlink data from a network entity;
- determining a schedule of a set of uplink channel resources associated with a medium access control layer;
- altering a behavior of data layer traffic based at least in part on a characteristic of the uplink channel resources, wherein the data layer traffic comprises communications between a host of the UE and a modem of the UE; and
- transmitting, to the network entity, a feedback message in connection with one or more of the uplink channel resources and based at least in part on altering the behavior of the data layer traffic.

13. The method of claim 12, where altering the behavior of the data layer traffic comprises:
- synchronizing delivery of host data from the host of the UE to the modem of the UE according to the schedule of the set of uplink channel resources associated with the medium access control layer.

14. The method of claim 12, wherein the downlink data is associated with triggering the feedback message.

15. The method of claim 12, wherein the set of uplink channel resources is associated with information identifying at least one of:
- a set of physical uplink control channel scheduling request occasions,
- an expiration of a periodic buffer status reporting timer,
- a predicted medium access control uplink buffer drain time,
- a semi-persistent scheduling occasion,
- a random access channel occasion.

16. The method of claim 12, wherein altering the behavior of the data layer traffic comprises:
- altering the behavior of the data layer traffic based at least in part on a configuration of a connected discontinuous reception mode.

17. The method of claim 12, further comprising:
- identifying, based at least in part on the set of uplink channel resources, a transmission opportunity associated with the set of uplink channel resources; and
- wherein altering the behavior of the data layer traffic comprises:
  - altering the behavior of the data layer traffic based at least in part on identifying the transmission opportunity.

18. The method of claim 12, wherein altering the behavior of the data layer traffic comprises:
- causing downlink data to be delivered from the medium access control layer to the host of the UE before a scheduled delivery time.

19. The method of claim 12, wherein altering the behavior of the data layer traffic comprises:
- causing a change to a data processing time of the downlink data at the host of the UE.

20. The method of claim 12, wherein altering the behavior of the data layer traffic comprises:
- causing uplink data to be delivered from the host of the UE to the medium access control layer before a scheduled delivery time.

21. The method of claim 12, wherein altering the behavior of the data layer traffic comprises:
- altering the behavior of the data layer traffic based at least in part on at least one of:
  - a timing of an uplink occasion,
  - whether a low-latency request is active,
  - a status of a transport layer connection, or
  - a status of a bearer.

22. A user equipment (UE) for wireless communication, comprising:
- a memory; and
- one or more processors coupled to the memory, the memory storing instructions executable by the one or more processors to cause the UE to:
  - receive downlink data that is associated with triggering a feedback message; and
  - transmit, before receiving the feedback message for the downlink data at a component of the UE, a scheduling request to request an allocation of a set of resources for transmitting the feedback message.

23. The UE of claim 22, wherein the instructions are further executable by the one or more processors to cause the UE to:
- determine a predicted arrival time of the feedback message; and
- wherein the one or more processors, that cause the UE to transmit the scheduling request, cause the UE to:
  - transmit the scheduling request based at least in part on the predicted arrival time of the feedback message.

24. The UE of claim 23, wherein the scheduling request is transmitted at a predicted scheduling request time, wherein the predicted scheduling request time is based at least in part on at least one of:
- a predicted time between receiving the downlink data and receiving the feedback message, or
- a predicted time between requesting the allocation of the set of resources and receiving a response granting the allocation of the set of resources.

25. The UE of claim 22, wherein the instructions are further executable by the one or more processors to cause the UE to:
- determine a flow identifier for the downlink data; and
- wherein the one or more processors, that cause the UE to transmit the scheduling request, cause the UE to:
  - transmit the scheduling request before receiving the feedback message for the downlink data based at least in part on the flow identifier.

26. A user equipment (UE) for wireless communication, comprising:
- a memory; and
- one or more processors coupled to the memory, the memory storing instructions executable by the one or more processors to cause the UE to:
  - receive downlink data from a network entity;
  - determine a schedule of a set of uplink channel resources associated with a medium access control layer;
  - alter a behavior of data layer traffic based at least in part on a characteristic of the uplink channel resources, wherein the data layer traffic comprises communication between a host of the UE and a modem of the UE; and
  - transmit, to the network entity, a feedback message in connection with one or more of the uplink channel resources and based at least in part on altering the behavior of the data layer traffic.

27. The UE of claim 26, wherein the downlink data is associated with triggering the feedback message.

28. The UE of claim 26, wherein the set of uplink channel resources is associated with information identifying at least one of:
- a set of physical uplink control channel scheduling request occasions, an expiration of a periodic buffer status reporting timer, or a predicted medium access control uplink buffer drain time.

29. The UE of claim 26, wherein the instructions are further executable by the one or more processors to cause the UE to:
   identify, based at least in part on the set of uplink channel resources, a transmission opportunity associated with the set of uplink channel resources; and
   wherein altering the behavior of the data layer traffic comprises:
      alter the behavior of the data layer traffic based at least in part on identifying the transmission opportunity.

30. The UE of claim 26, wherein the instructions are further executable by the one or more processors to cause the UE to:
   when altering the behavior of the data layer traffic, cause downlink data to be delivered from the medium access control layer to the host of the UE before a scheduled delivery time.

* * * * *